United States Patent [19]
Koenig, III

[11] 3,869,002
[45] Mar. 4, 1975

[54] SPINDLE CLAMP
[75] Inventor: Carl F. Koenig, III, Montgomery, Ohio
[73] Assignee: The Warner & Swasey Company, Cleveland, Ohio
[22] Filed: Jan. 14, 1974
[21] Appl. No.: 433,233

[52] U.S. Cl. .................................... 173/166, 90/11
[51] Int. Cl. ......................... B23c 1/02, B23b 39/02
[58] Field of Search ......... 173/166; 90/11, 11.1, 14; 77/3; 279/4

[56] References Cited
UNITED STATES PATENTS

| | | | |
|---|---|---|---|
| 2,957,393 | 10/1960 | Kampmeier | 90/11.1 |
| 3,034,408 | 5/1962 | Kampmeier | 279/4 |
| 3,103,144 | 9/1963 | Walter | 90/11.1 |
| 3,397,614 | 8/1968 | Meinke | 90/11 |
| 3,545,335 | 12/1970 | Lehmkuhl | 90/11 |

Primary Examiner—James A. Leppink

[57] ABSTRACT

An improved spindle clamp is utilized to prevent axial movement of the spindle of a horizontal boring machine relative to a drive sleeve. The spindle clamp includes a generally cylindrical metallic clamp member which circumscribes the spindle. This clamp member has a thin metallic wall or membrane which is resiliently deflectable inwardly under the influence of fluid pressure to grip the spindle and retain it against axial movement relative to the drive sleeve. To operate the spindle clamp from a disengaged condition to an engaged condition, an intensifier piston is exposed to control fluid pressure to intensify or increase the fluid pressure applied against the membrane portion of the clamp member. The intensifier piston is disposed in a readily accessible cylinder block which is mounted on an outer end portion of the drive sleeve. To facilitate access to the clamp member, it is disposed radially inwardly of the cylinder block. The clamp member is provided with an axially extending rib having a greater flexural rigidity than the membrane portion of the clamp member. This rib spans a slot or key way in the spindle and prevents the membrane portion of the clamp member from being deflected into the slot.

14 Claims, 4 Drawing Figures

SPINDLE CLAMP

BACKGROUND OF THE INVENTION

The present invention relates to a new and improved spindle clamp and more specifically to a spindle clamp which is advantageously utilized to prevent axial movement between a spindle and drive sleeve during the performance of work operations.

Horizontal boring and milling machines are commonly provided with a spindle which is adjusted axially relative to a drive sleeve to position a tool relative to a workpiece. Once the tool has been located in a desired position relative to the workpiece, a clamp assembly is operated to hold the spindle against axial movement relative to the drive sleeve. The drive sleeve and spindle are then rotated together to rotate the tool relative to the workpiece.

The spindle clamp assembly may be of the type which includes a generally cylindrical metallic clamp member having a thin wall or membrane which is flexed inwardly to grip the spindle under the influence of fluid pressure. To provide sufficient fluid pressure to flex the membrane and grip the spindle, a relatively large surface area on an intensifier piston has been subjected to a relatively low control fluid pressure. The piston is utilized to press a relatively small output surface area against a body of liquid which is connected in fluid communication with and fills a pressure chamber which is formed on one side of the membrane portion of the clamp member. Due to the relatively small output surface area of the intensifier piston, the body of liquid in the pressure chamber is subjected to a relatively high fluid pressure sufficient to cause the metallic membrane to flex radially inwardly and grip the spindle.

Serveral known spindle clamp arrangements are disclosed in U.S. Pat. Nos. 3,545,335; 3,516,328; and 3,034,408. These known spindle clamp arrangements include intensifier pistons and clamp members which are arranged about an internal portion of the drive sleeve at a location where they are relatively inaccessible. In addition, the membrane areas of at least some known clamp members span a longitudinally extending slot or keyway in the spindle and are subjected to relatively large stresses by engagement of corners of the slot with the membrane.

SUMMARY OF THE PRESENT INVENTION

The present invention provides a new and improved clamp arrangement which is utilized to hold a spindle against axial movement relative to a drive sleeve. To provide relatively easy accessibility for both construction and maintenance purposes, the clamp arrangement is advantageously disposed axially outwardly of an outer end portion of the drive sleeve. Thus, an intensifier piston which is utilized to intensify the fluid pressure applied against the membrane portion of a clamp member is disposed outwardly of the drive sleeve.

The clamp member is advantageously provided with a relatively rigid axially extending rib which spans a slot or keyway in the spindle to prevent excessive deformation or flexing of the clamp member in the area of the slot. If the relatively thin membrane portion of the clamp member was to span the slot, the membrane portion would be subjected to concentrated stress forces at the corners of the slot. Although a clamp member having this ribbed construction is advantageously utilized in association with a clamp arrangement which is disposed outwardly of the outer end portion of the drive sleeve, it is contemplated that a clamp member having the ribbed construction could be utilized in a clamp arrangement which is disposed inwardly of the outer end portion of the drive sleeve.

Accordingly, it is an object of this invention to provide a new and improved clamp assembly for holding a spindle against axial movement relative to a drive sleeve and wherein the clamp assembly is disposed outwardly of an axially outer end portion of the drive sleeve.

Another object of this invention is to provide a new and improved clamp assembly for retaining a spindle against axial movement relative to a drive sleeve and wherein the clamp assembly includes a clamp member having a relatively rigid rib which extends axially along and spans a slot or keyway in the spindle to prevent excessive deformation of a membrane portion of the clamp member in the area of the spindle slot.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
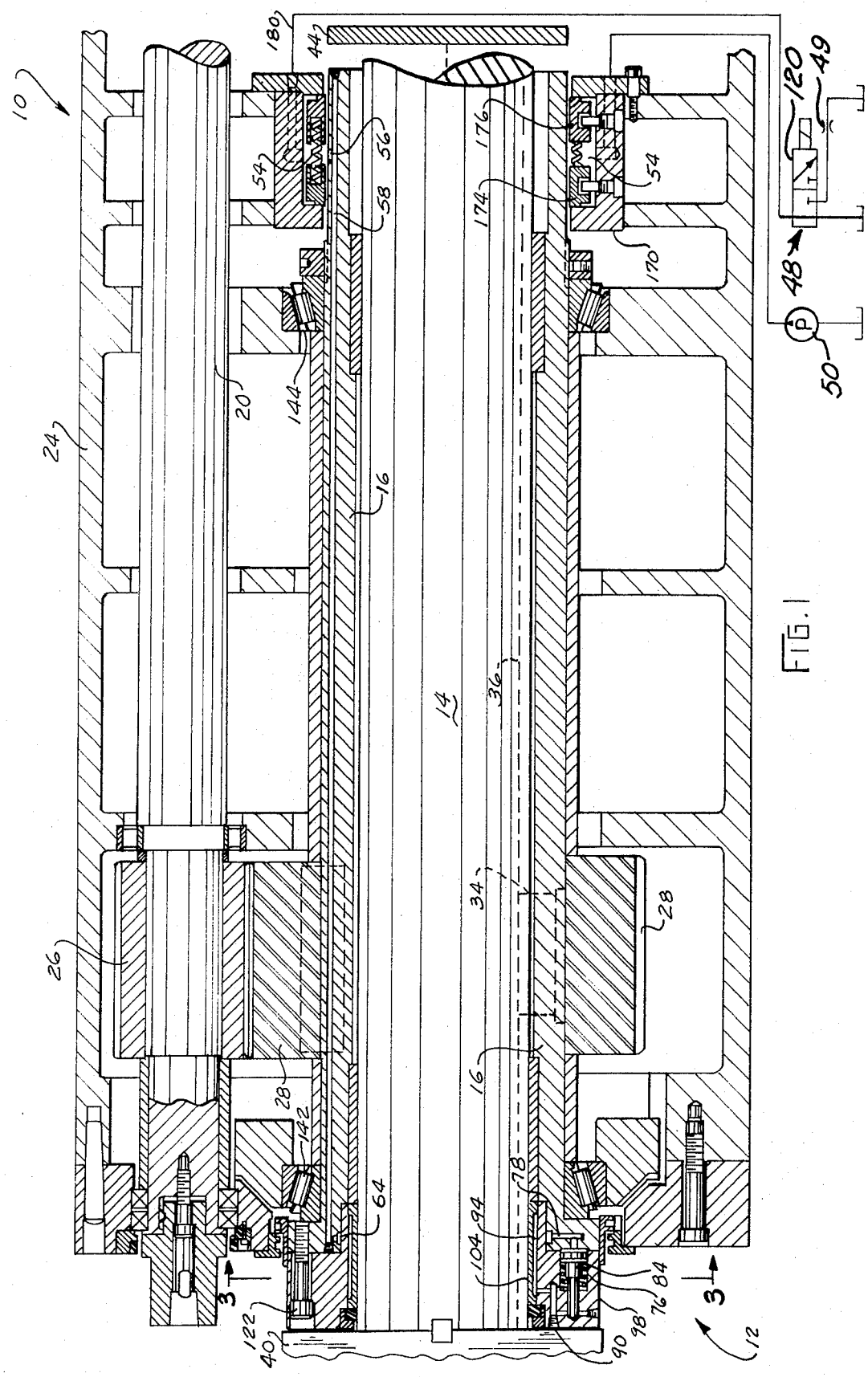
FIG. 1 is a sectional view of the ram of a horizontal boring machine and illustrates the relationship between a drive sleeve, spindle, and clamp assembly for preventing axial movement between the spindle and drive sleeve.
Figure 4:
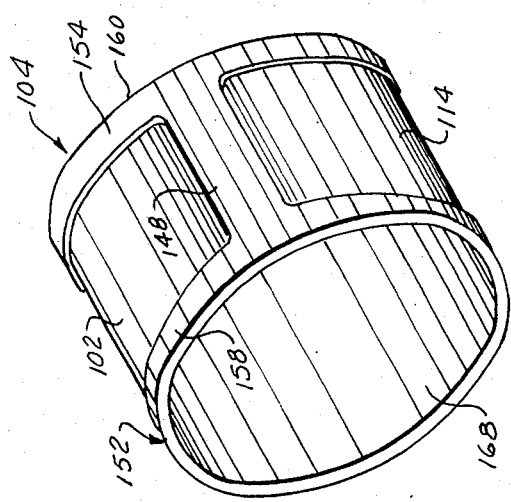
FIG. 4 is an enlarged illustration of the clamp member of FIG. 3.

A horizontal boring machine 10 has a clamp assembly 12 constructed in accordance with the present invention to prevent axial movement between a cylindrical spindle 14 which is disposed in a telescopic relationship with a cylindrical drive sleeve 16. During operation of the boring machine, a drive or pinion shaft 20 is rotated relative to a ram housing 24 to rotate a drive pinion 26 which is disposed in meshing engagement with a drive gear 28. The drive gear 28 is fixedly connected with the drive sleeve 16 by a key 30. The drive sleeve 16 is held against rotation relative to the spindle 14 by a key 34 which is received in an axially extending slot or keyway 36. A second axially extending slot 38 (FIG. 3) is formed in the spindle 14 and is engaged by a second key (not shown).

Upon rotation of the drive shaft 20, the pinion 26 rotates the spindle 14 and drive sleeve 16 about their coincident central axes to rotate a tool 40 relative to a workpiece (not shown). The longitudinally extending spindle slots 36 and 38 are keyed with the drive sleeve 16 in such a manner as to prevent relative rotation between the spindle 14 and drive sleeve. However, the axial slots 36 and 38 enable the spindle 14 to be shifted axially relative to the sleeve 16.

A suitable drive mechanism 44 is provided to move the spindle 14 axially when the clamp assembly 12 is in a disengaged condition to thereby position the tool 40 axially relative to the workpiece. Once the tool 40 has been positioned relative to the workpiece, the clamp assembly 12 is engaged to hold the spindle against axial movement relative to the drive sleeve 16. Since the manner in which the spindle 14 is moved axially by the mechanism 40 is well known, it will not be further described herein to avoid prolixity of description.

Figure 2:
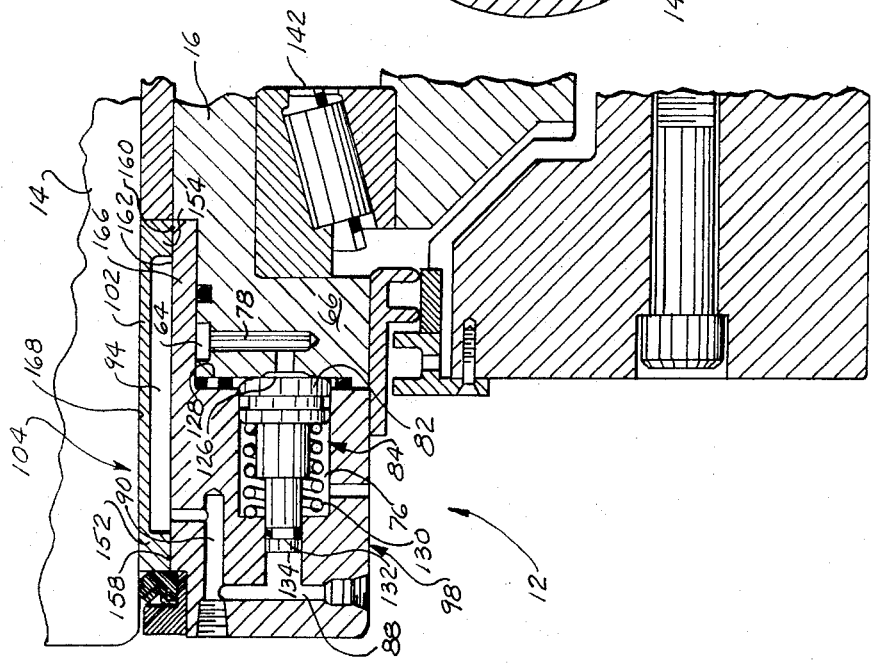
FIG. 2 is an enlarged fragmentary illustration of a portion of the clamp assembly.

When the clamp assembly 12 is to be operated from the disengaged condition to an engaged condition in which the clamp assembly holds the spindle 14 against axial movement relative to the drive sleeve 16, a valve 48 is operated from the position shown in FIG. 1 to an actuated position in which an orifice 49 restricts a flow of control fluid to drain. This restricted flow of control fluid results in an increase in fluid pressure in an annular chamber 54. Thus a pump 50 is conected through a supply line or conduit 52 with the annular chamber 54 which circumscribes the drive sleeve 16. The annular chamber 54 is connected through an opening 56 with an axially extending passage 58 formed in an upper (as view in FIG. 1) portion of the drive sleeve 16. The passage 58 extends axially along the drive sleeve 16 to an annular manifold ring 64 formed in an axially outer end portion 66 of the drive sleeve. The manifold ring 64 is connected in fluid communication with a plurality of intensifier piston chambers 70, 72, 74, and 76 (see FIG. 3) in the clamp assembly 12 by a plurality of radially extending passages 78 (one of which is shown in FIG. 2).

Control fluid pressure in the passage 78 (FIG. 2) acts against the circulr head end 82 of an intensifier piston 84 to urge the intensifier piston axially outwardly away from the annular outer end portion 66 of the drive sleeve 16. This increases the pressure to which a body of liquid 88 is subjected. The body of liquid 88 extends from the piston chamber 76 through passages 90 and completely fills an arcuate pressure chamber 94. The pressure chamber 94, (FIG. 3) includes a pair of arcuate sections 95 and 96 which are connected in fluid communication across a pair of axially extending ribs 97. The arcuate section 95 of the pressure chamber 94 is formed between an annular cylinder block 98 in which the piston chambers 70, 72, 74, and 76 are formed and a membrane portion 102 of a generally cylindrical clamp member 104. The arcuate section 96 of the pressure chamber 94 is formed between the cylinder block 98 and a second membrane portion 106 of the clamp member 104.

As the pressure on the body of liquid 88 increases, the relatively flexible membrane portions 102 and 106 of the clamp member 104 are flexed radially inwardly to grip the spindle 14. Although only the intensifier piston 84 has been illustrated in FIG. 2, it should be understood that there are similar intensifier pistons in each of the piston chambers 70, 72, and 74 (FIG. 3) and that these pistons are connected by passages, similar to the passage 78 with the annular manifold ring 64. The piston chambers 70 and 72 are connected in direct fluid communication with the arcuate section 96 of the pressure chamber 94. The piston chambers 74 and 76 are connected in direct fluid communication with the arcuate section 95 of the 94. Since the two arcuate chamber sections 95 and 96 are connected in fluid communication across the ribs 97, the piston chamber 70-76 are connected in fluid communication with each other.

Upon operation of the control valve 48 (FIG. 1) to restrict the exhausting of control fluid to drain and a resulting increase in the control fluid pressure in the axially extending passage 58 and the manifold ring 64, the body of liquid in the pressure chamber 94 (FIG. 3) is pressurized to flex the membrane portions 102 and 106 of the clamp member 104 inwardly to securely grip the spindle 14. To release the spindle 14 for axial movement relative to the drive sleeve 16, it is merely necessary to operate the valve 48 to shift the valve spool 120 to the position shown in FIG. 1. This enables a relatively unrestricted flow of fluid to be established through a conduit 180 to drain. When the chamber 54 is connected in an unrestricted manner with drain, a reduction in the fluid pressure in the chamber 54 is transmitted through the passage 58 and manifold ring 64 to the various piston chambers 70, 72, 74, and 76. Upon a reduction in the fluid pressure transmitted to the piston chambers, the fluid pressure applied against the membrane portions 102 and 106 of the clamp member 104 is reduced and the natural resiliency of the metallic membrane portions 102 and 106 causes them to spring back to their original positions. When this occurs, the spindle 14 can be shifted axially relative to the drive sleeve 16 by operation of the mechanism 44.

In accordance with a feature of the present invention, the clamp assembly 12 is mounted on an outer end portion 66 of the drive sleeve 16 so that the various components of the clamp assembly are readily accessible. Thus, the annular cylinder block 98 is disposed outwardly of an is fixedly connected with the annular outer end portion 66 of the drive sleeve 16 by suitable bolts 122 (only one of which is shown in FIG. 1). The piston chambers 70, 72, 74, and 76 are disposed axially outwardly of the outer end portion 66 of the drive sleeve 16 and have longitudinally extending central axes which are parallel to the central axes of the spindle 14 and drive sleeve 16.

The identical intensifier pistons disposed in the piston chambers 70, 72, 74, and 76 are located axially outwardly of the outer end portion 66 of the dirve sleeve 16. When the intensifier piston 84 is in the retracted position shown in FIG. 2, a relatively large circular head end surface 126 of the piston 84 is disposed in abutting engagement with an annular axially outer end surface 128 of the drive sleeve 16. The cyclindrical head end 82 of the piston 84 is urged toward the end surface 128 of the drive sleeve 16 by a biasing spring 130. A cylindrical rod end portion 132 of the piston 84 is provided with a relatively small rod end surface 134 which is exposed to the body of liquid 88.

Upon the application of control fluid pressure against the relatively large head end surface 126, the force applied by the rod end surface against the body of liquid 88 is effective to increase the fluid pressure in the body of liquid to a valve which is a multiple of the fluid pressure applied against the head end surface 126 of the piston. Thus, the head end surface 126 of the piston 84 has a surface area which is six times as great as the area of the rod end surface 134. The fluid pressure to which the body of liquid 88 is subjected is six times as great as the control fluid pressure applied against the head end surface 126.

The clamp member 104 is also located adjacent to the outer end portion of the drive sleeve 16. Although a portion of the clamp member 104 extends into a telescopic relationship with the outer end of the drive sleeve 16, the clamp member 104 and pressure chamber 94 extend outwardly past the outer end of the drive sleeve 16. The pressure chambers 94 is connected with the rod end of the piston chambers 70, 72, 74, and 76 by fluid passages 90 which are also disposed outwardly at the outer end portion of the drive sleeve 16. This enables the clamp assembly 12 to be disassembled by merely loosening the bolts 122 and moving the annular cylinder block 98 axially outwardly along the spindle 14. This can be accomplished without disturbing the relationship between the drive sleeve 16 and a pair of drive sleeve support bearings 142 and 144 which support the drive sleeve 16 for rotation relative to the housing 24. This is because the bearings 142 and 144 are located axially inwardly of the clamp assembly 12 and the outer end portion of the drive sleeve 16.

To facilitate maintenance and assembly of the clamp arrangement 12, the intensifier pistons are advantageously formed of a unitary construction. Thus, the head end portion 82 and the rod end portion 132 of the piston 84 are integrally formed from a single piece of material.

The ribs 97 of the clamp member 104 have a greater thickness than the membrane portions 102 and 106. The ribs 97 span or extend across the spindle slots or keyways 36 and 38 (see FIG. 3). If the membrane portions 102 and 106 extended across slots 36 and 38, the membrane portion would be deflected radially inwardly against the corners of the slots under the influence of fluid pressure in the chamber 94. This would result in stress concentrations in the membrane portions of the clamp member 104.

Figure 3:
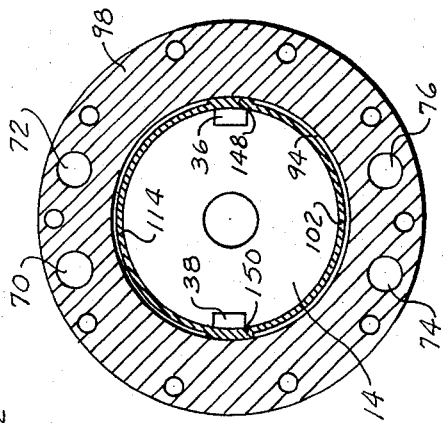
FIG. 3 is a sectional view, taken generally along the line 3—3 of FIG. 1, illustrating the relationship of a plurality of intensifier piston chambers to pressure chambers adjacent membrane portions of a clamp member.

To prevent the formation of excessive stress concentrations in the thin walled membrane portions 102 and 106 of the clamp member 104, the relatively thick ribs 97 span or extend across openings to the slots 36 and 38 (FIG. 3). The ribs 97 are integrally formed with the annular end portions 152 and 154 and have the same thickness as the annular end portions. Therefore, the ribs 97 have sufficient radial thickness to prevent them from being deflected into the axially extending slots 36 and 38. This is particularly true since the ribs 97 have widths which are greater than the widths of the slots 36 and 38.

The annular end portions 152 and 154 of the clamp member 104 have smooth cylindrical surfaces 158 and 160 which are disposed in flat abutting engagement with a smooth cylindrical surface 162 (FIG. 2) formed on the inside of the cylinder block 98. The smooth cylindric surface 162 cooperates with the clamp member 104 to define the two sections 95 and 96 of the pressure chamber 94. It should be noted that although a cylindrical inner wall 166 of the cylinder block 98 extends into a telescopic relationship with the outer end portion of the drive sleeve 16, the cylinder block can be readily moved axially outwardly upon loosening of the retaining bolts 122. However, if desired, the cylinder block 98 and the clamp member 104 could be contructed in such a manner that the clamp member 104 would be disposed entirely axially outwardly of the outer end surface 128 of the drive sleeve 16. In fact, it should be noted that a major portion of the clamp member 104 and the two pressure chambers 94 and 110 are, in the specific preferred embodiment of the invention illustrated in FIG. 2, disposed axially outwardly at the outer end surface 128 of the drive sleeve 16.

The clamp member 104 has a smooth continuous cylindrical inner surface 168 which extends parallel to the cylindrical surface 162 of the cylinder block 98 and is disposed in flat abutting engagement with the outer surface of the spindle 14. Of course, the flat abutting engagement between the smooth inner surface 168 of the clamp member 104 and the outer surface of the spindle 14 is interrupted in the area where the ribs 97 span the slots 36 and 38.

Although many different types of seals can be provided between the drive sleeve 16 and an annular wall 170 defining the chamber 54 (see FIG. 1), a pair of annular floating bushing seals 174 and 176 are utilized. The annular floating bushing seals 174 and 176 enable a controled leakage of fluid to pass between the drive sleeve 116 and the annular wall 170. To promote a flow of fluid from the pump 50 into the chamber 54 and to prevent the application of excessive fluid pressure against the intensifier pistons, the outlet conduit 180 is provided to conduct fluid from the chamber 54 to drain. The outlet conduit 180 is sized so that the flow of fluid from the chamber 54 through the outlet conduit is sufficient to prevent the build up of control fluid pressure within the chamber 54 and manifold ring 64 when the valve 48 is in the position shown in FIG. 1. However, when the valve 48 is actuated to the left of the position shown in FIG. 1, the orifice 49 restricts the flow of control fluid to drain with a resulting increase in the control fluid pressure in the chamber 54.

In view of the foregoing description, it can be seen that the clamp assembly 12 is readily accessible since it is disposed axially outwardly of the outer end portion 66 of the drive sleeve 16. This facilitates access to the intensifier pistons and the clamp member 104. The clamp member 104 is advantageously provided with relatively rigid axially ribs 97, which span or extend across the slots 36 and 38 in the spindle 14 to prevent the flexing of membrane portions 102 and 106 of the clamp member 104 into the slots. Although the clamp assembly 12 has been described herein in connection with a horizontal boring machine 10, it is contemplated that the clamp assembly may be advantageously utilized in association with other types of machines.

Having described one specific preferred embodiment of the invention, the following is claimed:

1. An apparatus comprising a housing, a rotatable longitudinally extending drive sleeve at least partially disposed within said housing, said drive sleeve having an axially outer end portion, a longitudinally extending spindle telescopically disposed within said drive sleeve and movable axially relative to said drive sleeve between a retracted position and an extended position extending axially outwardly beyond said axially outer end portion of said drive sleeve, and clamp means connected with said drive sleeve and operable between an engaged condition holding said spindle against axial movement relative to said drive sleeve and a disengaged condition in which said clamp means is ineffective to hold said spindle against axial movement relative to said drive sleeve, said clamp means including a generally cylindrical metallic clamp member circumscribing said spindle, said clamp member including a rigid metallic body portion having a first radial thickness and a metallic membrane portion disposed in engagement with said spindle and having a second radial thickness which is less than said first radial thickness, said metallic membrane portion of said clamp member being resiliently deflectable radially inwardly under the influence of a first fluid pressure to grip said spindle upon operation of said clamp means from the disengaged condition to the engaged condition, first surface means cooperating with said body and membrane portions of said clamp member to define a pressure chamber, second surface means disposed axially outwardly of said axially outer end portion of said drive sleeve for at least partially defining a piston chamber which is at least partially disposed axially outwardly of said axially outer end portion of said drive sleeve, a piston disposed in said piston chamber and located axially outwardly of said axially outer end portion of said drive sleeve, said piston including a first end surface having a relatively large area and a second end surface having a relatively small area, means for exposing said second end surface of said piston to a body of fluid connected in fluid communication with and filling said pressure chamber, and actuator means for effecting operation of said clamp means from the disengaged condition to the engaged condition by exposing said first end surface of said piston to a second fluid pressure which is less than said first fluid pressure to thereby effect an increase in the fluid pressure in said body of fluid to a fluid pressure which is at least as great as said first fluid pressure.

2. An apparatus as set forth in claim 1 wherein at least a portion of said pressure chamber is disposed axially outwardly of the axially outer end portion of said drive sleeve.

3. An apparatus as set forth in claim 1 wherein said first end surface of said piston is disposed in abutting engagement with said axially outer end portion of said drive sleeve when said clamp means is in said disengaged condition.

4. An apparatus as set forth in claim 1 wherein said piston chamber is disposed radially outwardly of said clamp member and has a central axis extending generally parallel to and spaced apart from the central axis of said drive sleeve.

5. An apparatus as set forth in claim 1 further including bearing means connected with said housing and said drive sleeve for supporting said drive sleeve for rotation about its central axis, said bearing means being disposed in engagement with said drive sleeve at a location axially inwardly of the axially outer end portion of said drive sleeve.

6. An apparatus as set forth in claim 1 further including a generally annular cylinder block circumscribing said clamp member at a location axially outwardly of said axially outer end portion of said drive sleeve, said second surface means being formed by said cylinder block.

7. An apparatus as set forth in claim 6 wherein said first surface means is formed by said cylinder block and is disposed radially inwardly of said second surface means.

8. An apparatus as set forth in claim 1 wherein said piston is integrally formed and includes a head portion on which said first end surface is disposed and a rod portion on which said second end surface is disposed.

9. An apparatus as set forth in claim 1 wherein said spindle includes surface for defining a longitudinally extending slot, said apparatus further including retainer means connected with said drive sleeve and extending into said longitudinally extending slot for preventing relative rotation between said spindle and drive sleeve, said body portion of said clamp member being disposed in a spanning relationship with said slot throughout the axial extent of said clamp member to prevent inward deformation of said clamp member at said slot.

10. An apparatus as set forth in claim 1 wherein said means for exposing said second end surface of said piston to a body of fluid includes a fluid passage extending between said pressure and piston chambers and disposed axially outwardly of said axially outer end portion of said drive sleeve.

11. An apparatus comprising a housing, a rotatable longitudinally extending drive sleeve at least partially disposed within said housing, a longitudinally extending spindle telescopically disposed within said drive sleeve and movable axially relative to said drive sleeve between a retracted position and an extended position, said spindle including surface means defining a longitudinally extending slot in said spindle, retainer means connected with said drive sleeve and extending into said spindle slot to retain said spindle and drive sleeve against rotation relative to each other, and clamp means connected with said drive sleeve and operable between an engaged condition holding said spindle against axial movement relative to said drive sleeve and a disengaged condition in which said clamp means is ineffective to hold said spindle against axial movement relative to said drive sleeve, said clamp means including a generally cylindrical metallic clamp member circumscribing said spindle, said clamp member including a rigid axially extending metallic rib disposed radially outwardly of said slot and having a first radial thickness and a metallic membrane portion disposed in engagement with said spindle and having a second radial thickness which is less than said first radial thickness, said metallic membrane portion of said clamp member being resiliently deflectable radially inwardly under the influence of a first fluid pressure to grip said spindle upon operation of said clamp means from the disengaged condition to the engaged condition, said rib having an axial extent which is at least as great as the axial extent of said membrane portion and a width which is at least as great as the width of said slot, said rib being disposed in a spanning relationship with an axially extending opening define by said slot to prevent deflection of said membrane portion into said slot under the influence of said first fluid pressure, first surface means cooperating with said clamp member to define a pressure chamber which is at least partially defined by a radially inner surface of said membrane portion, second surface means for at least partially defining a piston chamber, a piston disposed in said piston chamber, said piston including a first end surface having a relatively small large area and a second end surface having a relatively small area, means exposing said second end surface of said piston to a body of fluid connected in fluid communication with and filling said pressure chamber, and actuator means or effecting operation of said clamp means from the disengaged condition to the engaged condition by exposing said first end surface of said piston to a second fluid pressure which is less than said first fluid pressure to thereby effect an increase in the fluid pressure in said body of fluid to a fluid pressure which is at least as great as said first fluid pressure.

12. An apparatus as set forth in claim 11 wherein said clamp member further includes a continuous cylindrical inner surface disposed in abutting engagement with an outer surface of said spindle and extending the slot opening in said spindle.

13. An apparatus as set forth in claim 11 wherein said clamp member further includes a pair of annular body portions disposed at axially opposite ends of said membrane portion and intersecting said rib, said body portions having a radial thickness which is at least as great as said first radial thickness.

14. An apparatus as set forth in claim 11 wherein said rib extends axially outwardly of an axially outer end portion of said drive sleeve.

* * * * *

UNITED STATES PATENT OFFICE
CERTIFICATE OF CORRECTION

Patent No. 3,869,002          Dated March 4, 1975

Inventor(s) Carl F. Koenig, III

It is certified that error appears in the above-identified patent and that said Letters Patent are hereby corrected as shown below:

Column 8, line 54 delete "small".

Signed and sealed this 6th day of May 1975.

(SEAL)
Attest:

RUTH C. MASON
Attesting Officer

C. MARSHALL DANN
Commissioner of Patents
and Trademarks